United States Patent [19]

David

[11] E Re. 29,042

[45] Reissued Nov. 23, 1976

[54] APPARATUS FOR BUILDING A TOBACCO STREAM

[75] Inventor: Harry David, Hamburg, Germany

[73] Assignee: Hauni-Werke Korber & Co. KG, Hamburg, Germany

[22] Filed: Feb. 5, 1976

[21] Appl. No.: 655,549

Related U.S. Patent Documents

Reissue of:

[64] Patent No.: 3,871,385
Issued: Mar. 18, 1975
Appl. No.: 322,198
Filed: Jan. 9, 1973

[30] Foreign Application Priority Data

Jan. 26, 1972 Germany ..... 2203454
July 5, 1972 Germany ..... 2232856

[52] U.S. Cl. ..... 131/84 B; 131/21 A; 131/110

[51] Int. Cl.[2] ..... A24C 5/39

[58] Field of Search ..... 131/84 R, 84 B, 110, 131/21 R, 21 A

[56] References Cited

UNITED STATES PATENTS

| | | | |
|---|---|---|---|
| 2,635,301 | 4/1953 | Schubert et al. | 131/84 UX |
| 3,019,793 | 2/1962 | Labbe | 131/84 B |
| 3,034,514 | 5/1962 | Pinkham | 131/84 B |
| 3,074,413 | 1/1963 | McArthur | 131/84 B |
| 3,096,770 | 7/1963 | Dearsley | 131/110 X |
| 3,590,826 | 7/1971 | Wochnowski et al. | 131/21 A |
| 3,665,932 | 5/1972 | Goldbach | 131/21 R |

FOREIGN PATENTS OR APPLICATIONS

| | | | |
|---|---|---|---|
| 266,385 | 10/1913 | Germany | 131/110 |
| 445,044 | 4/1936 | United Kingdom | 131/84 B |
| 1,037,695 | 8/1966 | United Kingdom | 131/110 |

*Primary Examiner*—Stephen C. Pellegrino
*Attorney, Agent, or Firm*—Peter K. Kontler; John Kurucz

[57] ABSTRACT

A distributor for comminuted tobacco wherein a first conveyor, such as a carded drum, an endless apron or a pneumatic conveyor, supplies tobacco at a variable rate into the path of orbital movement of bristles on a rapidly rotating accelerating device. The bristles propel the particles of tobacco onto a narrow foraminous transporting belt which travels in a horizontal channel and accumulates a dense tobacco stream which is transported past a trimming device and into the wrapping mechanism of a cigarette rod making machine. The accelerating device is driven by a separate motor so that the peripheral speed of its bristles exceeds the speed of tobacco travel on the first conveyor. The stream is attracted to the transporting conveyor by suction, and the accelerating device is placed sufficiently close to the channel to insure that, during impact against the transporting conveyor or against the layer of tobacco thereon, the kinetic energy of all or nearly all tobacco particles is substantially identical. The accelerating device can be placed below, between or above the first conveyor and transporting conveyor and may form part of a winnowing assembly.

22 Claims, 10 Drawing Figures

1
2
3
4
6
7
8
9
9a
10
11
12
13
14
16
17
18
19
20
21
22
I
II
A

APPARATUS FOR BUILDING A TOBACCO STREAM

Matter enclosed in heavy brackets [ ] appears in the original patent but forms no part of this reissue specification; matter printed in italics indicates the additions made by reissue.

BACKGROUND OF THE INVENTION

The present invention relates to improvements in apparatus for building a tobacco stream. More particularly, the invention relates to improvements in apparatus which can be utilized as distributors in machines for the making of a continuous wrapped tobacco filler rod which is ready to be subdivided into plain cigarettes, cigars or cigarillos of unit length or multiple unit length. One of the presently preferred uses of the improved stream building apparatus is as a distributor for a cigarette rod making machine.

As a rule, the distributor of a cigarette rod making machine comprises a magazine for a supply of tobacco shreds or for a mixture of tobacco shreds and ribs, and an apron which withdraws a relatively wide carpet of tobacco from the magazine and showers it into a channel having a bottom wall formed by the upper stretch of an endless conveyor belt which transports the growing tobacco stream toward the next processing station, such as a station accommodating a trimming or equalizing device which removes the surplus of tobacco and thereby converts the stream into a filler rod. The moving parts of the distributor are normally driven at a variable speed in synchronism with other components of the cigarette rod making machine so that the rate at which the distributor delivers a continuous tobacco stream corresponds to the rate at which the machine can process tobacco to form a continuous wrapped filler rod.

In many instances, the tobacco which forms a relatively wide carpet [of] *or* sliver is caused to leave the discharge end of the apron by gravity and to descend into the channel wherein it forms a growing tobacco stream. This practice is normally resorted to in the manufacture of cigarettes, cigars or cigarillos as well as analogous rod-shaped smokers' products. It is also known to draw the tobacco stream into the channel by suction whereby the stream transporting belt can be located at a level above or below the apron. It is also customary to place a suction chamber adjacent to the stream transporting belt so as to insure that the particles of tobacco are attracted to the belt and cannot slip during transport toward the next processing station.

It is well known that the trimming operation is facilitated if the tobacco stream which advances into the range of the trimming device exhibits a uniform density throughout its entire cross section. It is also known that the tobacco stream should preferably have a constant or nearly constant height so that the trimming device removes a nearly uniform layer of surplus tobacco. This cannot be readily achieved in presently known distributors which almost invariably produce a tobacco stream with pronounced hills and valleys so that the layer of tobacco which is removed by the trimming device includes portions of different height or depth. The formation of hills and valleys is due to the fact that, when the particles of tobacco descend by gravity or are pulled by suction against the adjacent surface of the continuously travelling stream transporting belt, even minor variations in uniformity of tobacco delivery can cause certain unevennesses in the exposed surface of the growing tobacco stream. Such unevennesses become more pronounced as the tobacco stream continues to grow because the freshly admitted particles are likely to accumulate at the front sides or leading slopes of hills whereby the height of hills increases and the difference between the height of the tobacco stream below the valleys and below the hills becomes more pronounced. Such building of tobacco streams is undesirable because even the shallowest portion of the stream must at least slightly exceed the height or thickness of the filler so that the trimming device must remove substantial quantities of tobacco with attendant comminution of tobacco shreds and the formation of tobacco dust. Furthermore, the action of suction upon the particles which form the tobacco stream also contributes to differences in density of the tobacco stream. The effect of suction is a function of the height of the adjacent portion of the tobacco stream and of the position of tobacco particles relative to each other. Thus, the particles which are immediately adjacent to the transporting stretch of the belt are properly attracted by the suction chamber whereby the innermost portion of the growing tobacco stream undergoes a rather pronounced densifying or compacting action. However, as the distance between the particles of a growing stream and the suction chamber increases, the effect of suction upon the outermost portion of the tobacco stream decreases so that the outermost portion of the growing stream exhibits a much less pronounced density than the portion which is immediately adjacent to the transporting belt. Consequently, those portions of a tobacco stream which form the hills are subjected to a much less pronounced densifying action than the portions below the valleys which are closer to the belt. Moreover, the suction cannot be increased at will because this would further promote the difference between the density of a tobacco layer which is immediately adjacent to the belt and the tobacco layer or layers which are more distant from the belt. Also, if the density of the tobacco layer which is immediately adjacent to the belt is increased beyond a certain limit, the porosity of such layer decreases to such an extent that the currents of air cannot attract the particles in the outer portion of the stream, i.e., the outermost particles are likely to move relative to the belt and thus remain in the stream building zone.

SUMMARY OF THE INVENTION

An object of the invention is to provide a novel and improved apparatus which can build a tobacco stream wherein all portions exhibit the same density or substantially identical density.

Another object of the invention is to provide a novel and improved distributor for use in machines for the production of wrapped tobacco filler rods which can be subdivided to yield plain cigarettes, cigars or cigarillos of unit length of multiple unit length.

A further object of the invention is to provide a stream building apparatus with novel and improved means for transferring tobacco between a first conveyor which advances tobacco in the form of a carpet or layer and a second conveyor which transports tobacco in the form of a narrow stream.

An additional object of the invention is to provide a distributor for use in a cigarette rod making or analogous machine with novel and improved means for regulating the density of the growing tobacco stream.

An additional object of the invention is to provide a distributor with novel and improved means for compacting the particles of a growing tobacco stream without any or with minimal reliance upon suction.

Another object of the invention is to provide a distributor which can be used as a substitute for presently known distributors in existing machines for the production of wrapped tobacco filler rods.

The invention is embodied in a machine for the making of wrapped tobacco filler rods, and more particularly in an apparatus for building in such a machine a continuous tobacco stream, for example, a stream of shredded tobacco which can be converted into the filler of a wrapped cigarette rod.

The stream building apparatus comprises a magazine, hopper or an analogous source of comminuted tobacco, a tobacco feeding unit which is arranged to receive or draw tobacco from the source and includes a first conveyor operable at a plurality of speeds (preferably in synchronism with other moving parts of the filler rod making machine) to transport the withdrawn tobacco along a first portion of an elongated path which extends through the tobacco filler rod making machine, a preferably narrow belt-like tobacco stream transporting second conveyor which is adjacent to a second portion of the path, an accelerating device which is disposed between the conveyors and is operative to mechanically accelerate comminuted tobacco for transfer into the second portion of the path wherein the accelerated tobacco forms a growing stream which is transported by the second conveyor, and means for operating the accelerating device independently of the second and/or first conveyor.

The accelerating device may include a rotary conveyor, for example, a drum provided with an elastic or yieldable (deformable) peripheral portion including or consisting of substantially radially extending bristles or pins. The operating means for the acceleraing device may comprise a variable-speed motor or transmission which drives the accelerating device at a speed exceeding the speed of comminuted tobacco on the first conveyor. The accelerating action of the bristles is preferably selected in such a way that the density of the stream on the second conveyor considerably exceeds half the density of the wrapped filler rod.

The first conveyor can discharge comminuted tobacco by gravity; it may cooperate with a picker roller; or it may deliver comminuted tobacco into a pneumatic conveyor for transport into the range of the accelerating device. The latter may be mounted at a level between the first and second conveyors, at a level above the second conveyor, at a level above the first conveyor, at a level below the second conveyor, or at a level above both conveyors.

The novel features which are considered as characteristic of the invention are set forth in particular in the appended claims. The improved tobacco stream building apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged fragmentary transverse vertical sectional view of the distributor as seen in the direction of arrows from the line II—II of FIG. 1a;

FIG. 4 (composed of FIGS. 4a and 4b) is an enlarged transverse vertical sectional view as seen in the direction of arrows from the line IV—IV of FIG. 3a;

DESCRIPTION OF THE PREFERRED EMBODIMENTS

Figures 1A, 1B:
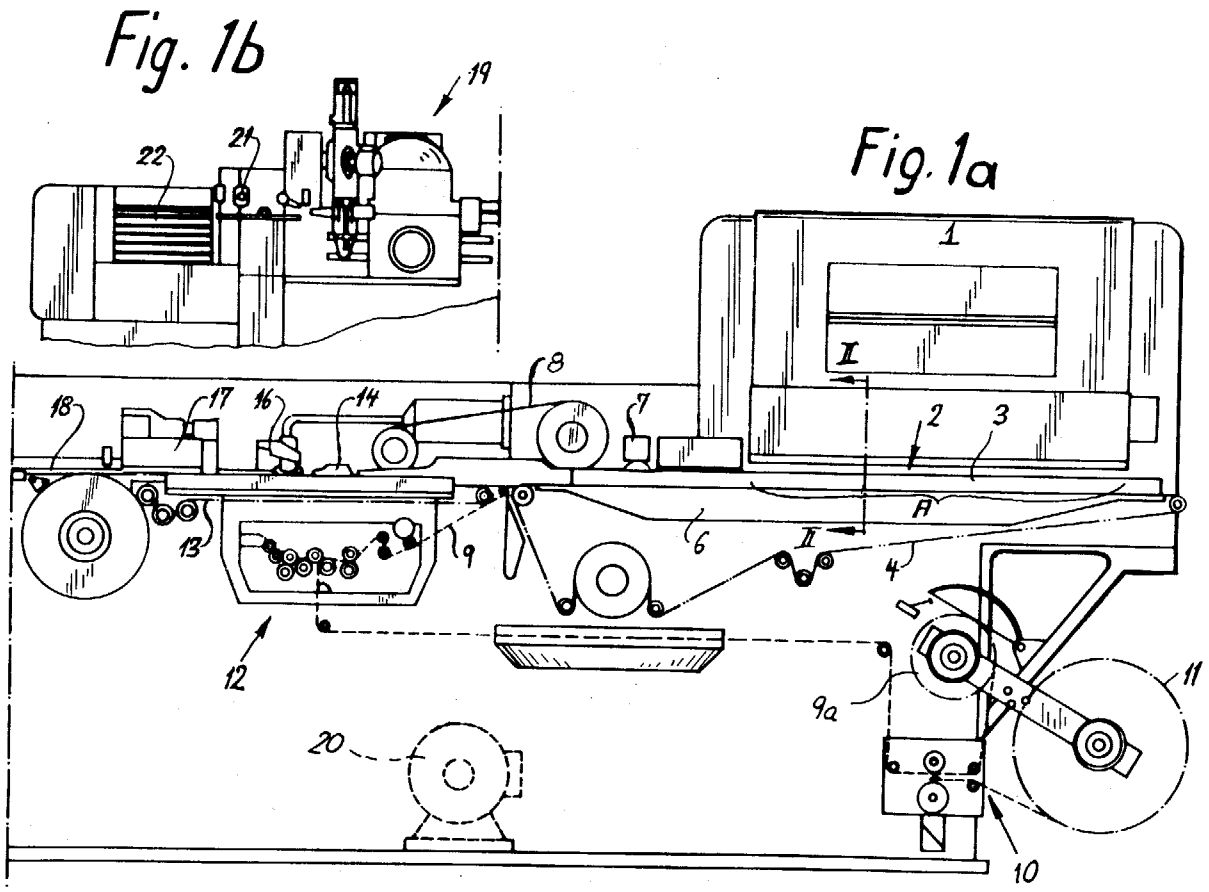
FIG. 1 (composed of FIGS. 1a and 1b) is a schematic elevational view of a machine for the making of a wrapped tobacco filler rod which includes a tobacco stream building distributor constucted and assembled in accordance with a first embodiment of the invention.

Referring first to FIGS. 1a and 1b, there is shown a cigarette rod making machine which comprises an overhead distributor 1 including a narrow elongated channel 3 (see also FIG. 2) wherein the component parts of the distributor build a narrow tobacco stream 2. The tobacco stream building zone is shown at A. The bottom wall of the channel 3 is formed by the upper stretch of an elongated tobacco stream advancing or transporting conveyor 4 which is an endless foraminous bell trained over a number of rollers shown in FIG. 1a. A suction chamber 6 is provided at a level below the upper stretch of the stream transporting conveyor 4 to attract the particles of the tobacco stream 2 so that successive increments of the growing stream are compelled to advance in and beyond the building zone A. The top wall of the suction chamber 6 is provided with suction ports 6a (see FIG. 2). Since the material of the stream transporting conveyor 4 is foraminous, the chamber 6 can draw small currents of air therethrough.

Successive increments of the fully grown tobacco stream 2 advance into the range of one or more cutters forming part of a trimming or equalizing device 7 which is adjacent to the upper stretch of the stream transporting belt 4 downwstream of the zone A and which serves to remove from the tobacco stream the surplus of comminuted tobacco so that the stream is converted into a rod-like filler which thereupon enters a wrapping mechanism. The wrapping mechanism comprises a so-called garniture belt 13 having an upper stretch which travels below a draping device 14, a paster 16, a heated sealer 17 and thereupon returns toward the discharge end of the conveyor 4. The filler which is obtained upon trimming of the tobacco stream 2 is transferred onto the upper stretch of the belt 13 with the assistance from an endless steel belt 8 which causes successive increments of the filler to move onto and to advance with an elongated web 9 of cigarette paper. The web 9 is stored in the form of a roll 9a and passes through a normally idle splicing device 10. A fresh roll 11 of cigarette paper is held in a position or readiness at the splicing station so that its leader can be attached to the expiring web 9 when the supply of web on the roll 9a has been depleted to a predetermined minimum value.

The draping device 14 of the wrapping mechanism is provided with means for converting the web 9 into a substantially U-shaped body which surrounds three sides of the filler and for thereupon folding one marginal portion of such U-shaped body over the filler whereby only one marginal portion extends from the partially wrapped filler to move along the paster 16 which coats it with a film of adhesive. The wrapping mechanism further comprises means for folding the adhesive-coated marginal portion of the web 9 over the other marginal portion to form a seam which is caused to set during travel along the sealer 17 so that the filler and the web 9 are converted into a continuous wrapped filler rod or cigarette rod 18. The reference character 12 denotes in FIG. 1a an imprinting mechanism which is adjacent to the path of travel of the web 9 from the splicing device 10 toward the upper stretch of the belt 13 and provides longitudinally spaced portions of the web with printed matter.

The wrapped filler rod 18 thereupon enters a conventional cutoff 19 (shown in FIG. 1b) which subdivides the rod into discrete plain cigarettes of unit length. Such cigarettes form a single file and travel below a rapidly rotating accelerating cam 21 which propels successive plain cigarettes into successive flutes of a rotating transfer conveyor 22 here shown as a drum which transports plain cigarettes sideways toward a tray filling apparatus, to a packing machine or to a filter cigarette making machine. The cigarettes in the flutes of the transfer conveyor 22 can form one or more rows. FIG. 1a further shows a main prime mover 20 which is preferably a variable-speed electric motor serving to drive the majority of moving parts of the cigarette making machine. Such moving parts include the stream transporting conveyor 4, the belt 13 and the cutoff 19.

The wrapping mechanism shown in FIG. 1a further serves to densify or compact the rod-like filler so that the contents of the wrapper of the rod 18 are compacted to a predetermined extent.

Figure 2:
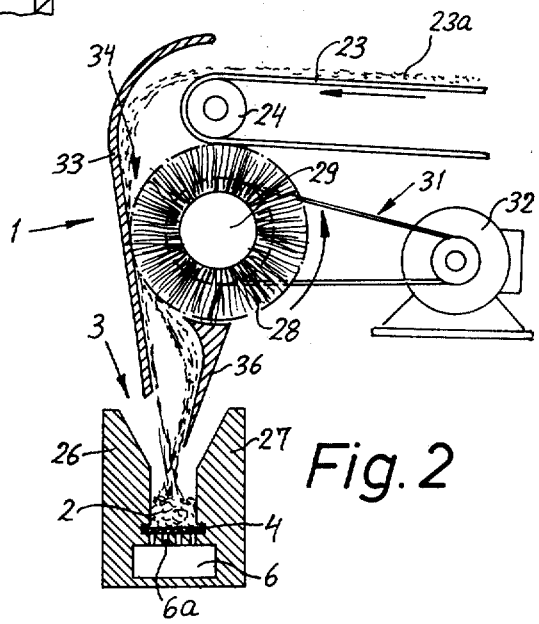

FIG. 2 is a sectional view of the distributor 1 which includes the channel 3 with the stream transporting conveyor 4. The distributor 1 further comprises a tobacco feeding unit including a conveyor 23 here shown as an endless apron which is trained over several rollers 24 (only one shown) and transports a relatively wide carpet or layer 23a of comminuted tobacco along a first portion of an elongated path. A second portion of this path is adjacent to the upper stretch of the stream transporting conveyor 4. The discharge end of the upper stretch of the apron 23 is located at a level above the channel 3, and the tobacco which is being discharged by this apron impinges upon an arcuate baffle 33 to descend into a funnel 34 which is defined in part by the baffle 33 and in part by the bristles 28 of a rotary accelerating device or conveyor 29. In accordance with a feature of the invention, the accelerating device 29 is operated (rotated) independently of the apron 23 by a discrete motor 32 through the intermediary of a belt or chain transmission 31. The speed of the apron 23 varies in synchronism with the speed of other moving parts of the cigarette rod making machine, i.e., the apron can be driven by the prime mover 20 shown in FIG. 1a. As a rule, the machine of FIGS. 1a and 1b is driven at two different speeds, namely, at a lower speed immediately after starting and thereupon at a higher or normal operating speed at which the machine of FIGS. 1a and 1b can turn out up to and in excess of 70 plain cigarettes per second.

Referring again to FIG. 2, the channel 3 is provided with side walls 26, 27 flanking the particles of tobacco which are being propelled downwardly by the bristles 28 of the rotating accelerating device 29. The upper portions of the internal surfaces of side walls 26, 27 diverge upwardly and outwardly toward the underside of the accelerating device 29. The axial length of the accelerating device 29 preferably equals or approximates the width of the apron 23 and corresponds to the length of the tobacco stream growing zone A shown in FIG. 1a. The speed of the belt transmission 31 is selected in such a way that the peripheral speed of the accelerating device 29 exceeds the speed of lengthwise movement of the tobacco layer 23a on the apron 23. The tips of bristles 28 preferably touch or come very close to the adjacent surface of the baffle 33 so as to make sure that each and every particle of tobacco which enters the funnel 34 is accelerated and propelled in a direction toward the space between the side walls 26 and 27 of the channel 3. FIG. 2 further shows a second baffle 36 which is located below the acceleraing device 29 and has a concave side facing the adjacent lower end portion of the baffle 33 to define therewith a passage wherein the accelerated particles of comminuted tobacco travel toward the upper stretch of the stream transporting conveyor 4.

It will be noted that the accelerating device 29 is disposed at a level between the apron 23 and conveyor 4 and that the apron 23 cooperates with the baffle 33 to partially fill the funnel 34 with comminuted tobacco which descends into the funnel by gravity. The direction of travel of tobacco on the apron 23 is normal to the direction of travel of tobacco on the conveyor 4.

The operation of the cigarette rod making machine of FIGS. 1a and 1b is as follows:

The upper stretch of the apron 23 shown in FIG. 2 receives a continuous supply of comminuted tobacco which forms thereon the layer or carpet 23a and is advanced toward and beyond the illustrated roller 24. The particles of comminuted tobacco which advance beyond the discharge end of the apron 23 descend by gravity to enter the funnel 34 and to thus move into the range of rapidly orbiting bristles 28 of the accelerating device 29. Since the bristles 28 actually touch or come close to the adjacent surface of the baffle 33, all particles of tobacco which enter the funnel 34 are accelerated at the same rate and are propelled into the passage between the baffles 33 and 36 to thereupon enter the channel 3 and to come to rest on the upper stretch of the continuously moving stream transporting conveyor 4. The particles which descend onto the conveyor 4 form the stream 2 which grows during travel along the zone A and thereupon advances past the trimming device 7 of FIG. 1a. The energy of tobacco particles which are propelled by the bristles 28 greatly exceeds the energy of tobacco particles which enter the funnel 34. This is attributed to the fact that the accelerating device 29 is driven at a speed which exceeds the speed of the apron 23. The purpose of the suction chamber 6 is to insure that the particles of tobacco which form the stream 2 are attracted to the upper side of the conveyor 4 and travel therewith in a direction toward the trimming station. The purpose of the baffles 33 and 36 is to confine the mass of accelerated tobacco particles which are being transferred from the funnel 34 into the space between the side walls 26 and 27.

The accelerating action of the device 29 is preferably such that the particles of tobacco which come to rest on the upper stretch of the transporting conveyor 4 form a dense stream 2, namely, a stream whose density preferably greatly exceeds half the density of the filler in the wrapped rod 18 shown in FIG. 1a. For example, the density of the stream 2 on the transporting conveyor 4 may approximate 75 percent of the density of the filler in the rod 18. Such compacting of tobacco particles which form the stream 2 is attributed to the fact that the particles which are accelerated by the bristles 28 of the device 29 not only descend on top of each other but, owing to their high kinetic energy, actually fill the interstices or gaps between the adjoining particles of tobacco (mainly tobacco shreds).

Such filling of interstices insures that the density of the stream 2 greatly exceeds the density of a stream which would be formed if the particles leaving the upper stretch of the apron 23 were allowed to descend onto the conveyor 4 merely under the action of gravity.

It was found that the compacting action of the accelerating device 29 is sufficiently pronounced to insure that the expansion of the stream 2 in the channel 3 is negligible or minimal if the suction in the chamber 6 is terminated, i.e., if the ports 6a cease to draw currents of air across the tobacco stream in the channel 3. In other words, the influence of suction chamber 6 upon the density of the tobacco stream 2 on the upper stretch of the transporting conveyor 4 is extremely small, especially if compared with the compacting action of the accelerating device 29.

The accelerating device 29 is preferably mounted close to the stream transporting conveyor 4 to thus insure that the speed of particles of comminuted tobacco does not decrease materially during travel from the region of contact with the bristles 28 onto the upper stretch of the conveyor 4 or onto the tobacco particles on this stretch. This insures that, during impact against the conveyor 4 or against tobacco particles on this conveyor, the kinetc energy of all accelerated tobacco particles is at least substantially identical. Consequently, by properly selecting the speed of the accelerating device 29, one can accurately determine in advance the density of all portions of the tobacco stream 2 in the channel 3 to thus insure that the particles are densely packed, not because of the action of suction chamber 6, but rather as a direct result of acceleration of tobacco particles by the orbiting bristles 28. Thus, the density of the topmost layer of tobacco particles which form the stream 2 is identical with or closely approximates the density of that layer which is immediately adjacent to the upper stretch of the transporting conveyor 4. The exact density depends on the selected speed of the accelerating device 29 or an analogous accelerating device.

If the density of the stream 2 substantially exceeds half the density of the filler in the rod 18, the friction between the internal surface of the channel 3 and the tobacco stream 2 is likely to reach a value at which some particles of the stream might be caused to move relative to the transporting conveyor 4 or vice versa. The function of the suction chamber 6 is to prevent or at least reduce the likelihood of movement of the upper stretch of the transporting conveyor 4 relative to those particles of tobacco in the stream 2 which contact the internal surfaces of the channel 3.

Figures 3A, 3B:
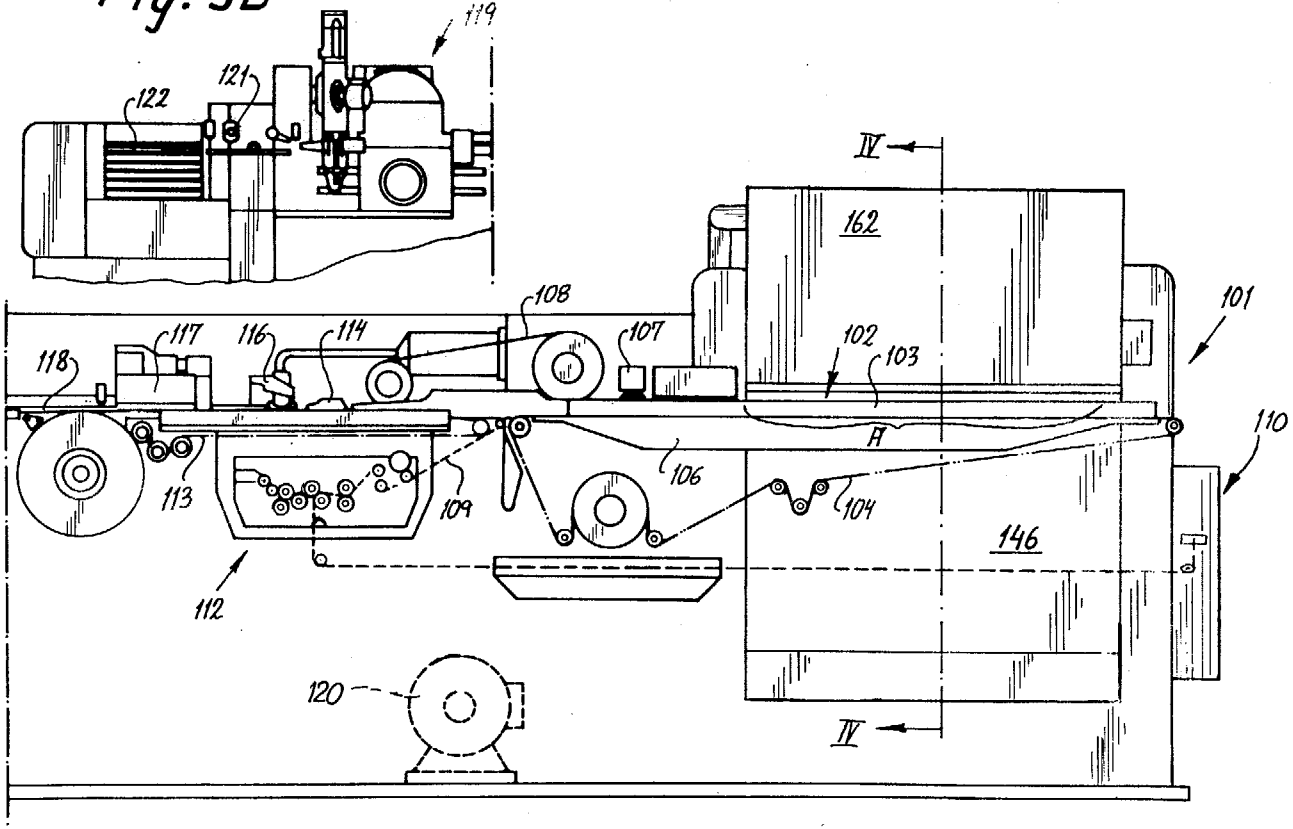
FIG. 3 (composed of FIGS. 3a and 3b) is a schematic elevational view of another machine for the making of a wrapped tobacco filler rod which embodies a different tobacco stream building distributor.

FIGS. 3a and 3b illustrate a modified cigarette rod making machine wherein all such parts which are identical with or clearly analogous to the corresponding parts of the machine shown in FIGS. 1a and 1b are denoted by similar reference characters plus 100. The main difference between the machines of FIGS. 1a–1b and 3a–3b is that the tobacco stream building distributor 101 of FIG. 3a (shown in greater detail in FIGS. 4a and 4b) is designed to transport shredded tobacco, or a mixture of tobacco shreds and ribs or stem, upwardly and to thereupon deflect the shreds so that they descend onto the upper stretch of the stream transporting conveyor 104.

Figure 4A:
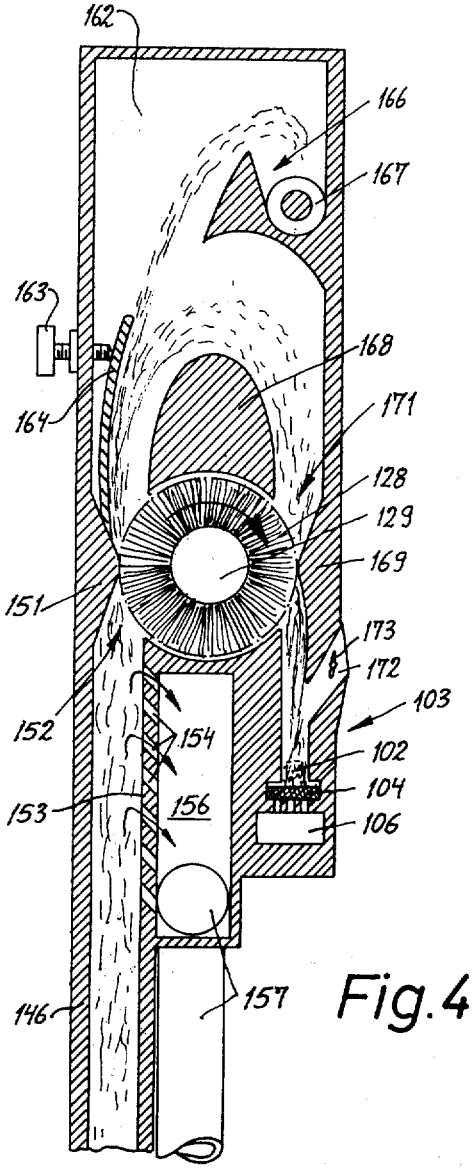
Figure 4B:
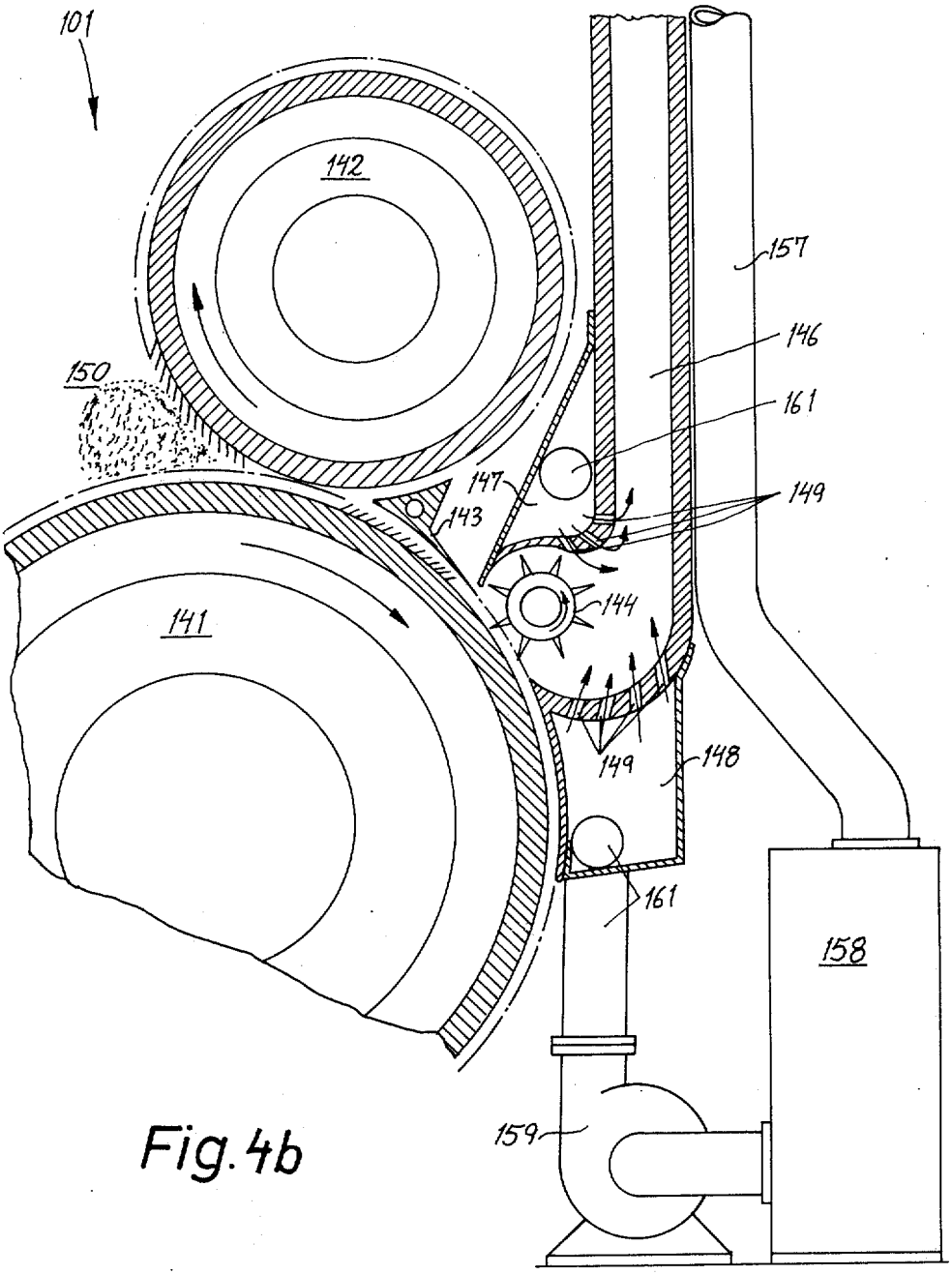

Referring to FIGS. 4a and 4b, the distributor 101 comprises a tobacco feeding unit having a conveyor 141 which corresponds to the apron 23 of FIG. 2 and is shown in the form of a carded drum serving to draw a mixture of randomly distributed tobacco shreds and ribs from a source 150. The carded drum 141 cooperated with a drum-shaped refuser 142 of the feeding unit which removes from the carding of the drum 141 the surplus of tobacco whereby the thus equalized sliver or layer of tobacco shreds and ribs advances beyond the nip of the drums 141, 142 and travels below a mechanical retainer 143 and into the range of a rapidly rotating picker roller 144. This roller also forms part of the feeding unit and serves as a means for mechanically expelling successive increments of the sliver from the carding of the drum 141. The retainer 143 may resemble a comb having a number of parallel prongs extending at a predetermined distance from the periphery of the continuously rotating drum 141. The speed of the drum 141 varies as a function of changes in the operating speed of the cigarette rod making machine shown in FIGS. 3a and 3b. The drum 141 can be driven by the prime mover 120 of FIG. 3a.

The particles of tobacco which are removed from the carding of the drum 141 by the picker roller 144 are fed into the lower end portion of an upright pneumatic conveyor 146 here shown as a duct having orifices 149 which enable its lower end portion to communicate with two discrete plenum chambers 147 and 148. The plenum chambers 147 and 148 are respectively located at a level above and below the picker roller 144 and are connected to each other by an air-supplying pressure pipe 161 connected to the outlet of a source of compressed air here shown as a blower 159.

As shown in FIG. 4a, the upper end of the duct 146 is closed by a wall 151 of the housing of the distributor 101 and by the adjacent bristles 128 of the accelerating device 129. The wall 151 of the distributor housing defines with the accelerating device 129 a first funnel 152 from which the air is being withdrawn into a suction chamber 156 by way of several downwardly inclined suction ports 154. The suction chamber 156 is connected with the intake of the blower 159 by way of a suction pipe 157 containing an air filter 158. The suction ports 154 are provided in a wall 153 of the duct 146.

The housing of the distributor 101 further defines a separator chamber 162 located at a level above the accelerating device 129 and containing an adjustable baffle 164 whose inclination can be changed by an adjusting screw 163 mounted in the wall 151. The separator chamber 162 further contains a receptacle 166 for heavier tobacco particles (mainly larger fragments of ribs and/or stem) and a feed screw 167 which can be operated continuously or intermittently to evacuate the contents of the receptacle 166. The lower portion of the separator chamber 162 accommodates a substantially semicylindrical guide 168 around which the lighter tobacco particles (mainly smaller fragments of ribs and shreds) travel on their way into a second funnel 171. This second funnel is defined by the bristles 128 and a further wall 169 of the distributor 101. The wall 169 is provided with an air-admitting opening 172 containing an adjustable regulating valve 173. The wall 169 forms part of the channel 103 which contains the suction chamber 106 and receives the upper stretch of the foraminous conveyor 104 serving to support and transport the growing and fully grown tobacco stream 102 during travel toward the wrapping mechanism shown in FIG. 3a.

The purpose of the adjustable baffle 164 is to control the direction of travel of heavier tobacco particles so as to make sure that such particles enter the receptacle 166. The regulating valve 173 controls the rate of admission of air which is being drawn across the tobacco stream 102 and through the openings of the transporting conveyor 104 to enter the suction chamber 106.

It will be noted that the accelerating device 129 is located at a level above the drum 141 and transporting conveyor 104 but below the separator chamber 162, and that the duct 146 is located between the drum 141 and the accelerating device 129.

The operation of the cigarette rod making machine including the structure shown in FIGS. 3a, 3b, 4a and 4b is as follows:

The carded drum 141 of the feeding unit draws from the source 150 a continuous layer of a mixture of tobacco shreds and ribs and advances the layer toward the lowermost portion of the refuser 142. The carding of the refuser 142 returns the surplus to the source 150 and allows an equalized layer of the mixture to advance below the mechanical retainer 143 and into the range of the rapidly rotating picker roller 144. The paricles of tobacco thereupon enter the lower end portion of the duct 146 and are entrained upwardly by the currents of air which are admitted by way of orifices 149 from the plenum chambers 147 and 148. It is assumed that the motor of the blower 159 is driven so that this blower supplies into the pipe 161 a continuous stream of compressed air and draws a continuous stream of air from the pipe 157 by way of the air filter 158. The air which entrains the particles of tobacco in the duct 146 is withdrawn through the suction ports 154 to enter the suction pipe 157 and to be returned to the intake of the blower 159. It will be noted that the inclination of ports 154 is sufficient to insure that the inertia of ascending particles of tobacco causes such particles to enter the funnel 152. The bristles 128 of the accelerating device 129 touch the adjacent protuberance of the wall 151 so that each and every particle is accelerated and travels upwardly along the concave side of the adjustable baffle 164. The flight span of heavier tobacco particles is longer; therefore, such particles travel along the entire or substantially along the entire concave side of the baffle 164 and accumulate in the receptacle 166 to be evacuated by the feed screw 167. The flight span of lighter tobacco particles (mainly shreds) is shorter so that such particles travel about the guide 168 and descend into the funnel 171. The bristles 128 of the accelerating device 129 touch the adjacent protruberance of the wall 169 so that each and every lighter tobacco particle is propelled with the same force to travel downwardly and to come to rest on the upper stretch of the continuously moving stream transporting conveyor 104. The lighter particles form the growing tobacco stream 102 which is attracted to the upper side of the upper stretch of the transporting conveyor 104 by air admitted through the opening 172 at the rate determined by the setting of regulating valve 173 and flowing downwardly into the suction chamber 106. The suction chamber 106 may be connected with the intake of the blower 159 or to a discrete suction generating device (not shown).

The manner in which the tobacco stream 102 is thereupon converted into a filler during travel below the trimming device 107 and is wrapped into the web 109 of FIG. 3a to form a continuous wrapped filler rod or cigarette rod 118 is the same as described in connection with FIGS. 1a and 1b. The rod 118 is subdivided during travel through the cutoff 119 of FIG. 3b to yield a single file of plain cigarettes which are accelerated by the cam 121 and are propelled into successive flutes of the transfer conveyor 122. FIG. 3a shows that the width of the duct 146 equals or approximates the length of the tobacco stream growing zone A. The length of this zone also equals the axial length of the drum 141, refuser 142, picker roller 144 and accelerating device 129.

It is clear that the accelerating device 129 of FIG. 4a can be replaced with two discrete accelerating devices one of which forms part of the separator to segregate lighter tobacco particles from heavier tobacco particles and cooperates with the wall 151, and the other of which serves to accelerate the lighter tobacco particles which enter the funnel 171 so that such particles are accelerated sufficiently to form on the transporting conveyor 104 a relatively dense tobacco stream 102, namely, a tobacco stream whose density preferably greatly exceeds half the density of the filler in the wrapped rod 118.

The mixture in the source 150 of FIG. 14a normally contains randomly distributed shreds of tobacco leaves and comminuted tobacco ribs and/or stem. Since the ribs cannot be severed with the same degree of accuracy as tobacco leaf laminae, the mixture of ribs and shreds normally contains smaller and larger fragments of ribs. The larger fragments of ribs should be prevented from entering the wrapping mechanism because, they are likely to puncture the web 109 and/or to prevent the formation of a satisfactory seam. The segregation of larger fragments of ribs takes place in the separator chamber 162 of FIG. 4a. As mentioned above, the utilization of accelerating device 129 as a component part of the means for segregating heavier tobacco particles from lighter tobacco particles constitutes an advantageous but optional feature of the distributor 101 because the latter may comprise a classifying means or separator which need not include the accelerating device 129. For example, comminuted tobacco which rises in the duct 146 of FIG. 4a can be classified by resorting to one or more winnowers, and the accelerating device 129 (or an analogous accelerating device) then performs the sole function of propelling the lighter tobacco particles into the channel 103 to form the stream 102.

Figure 5:
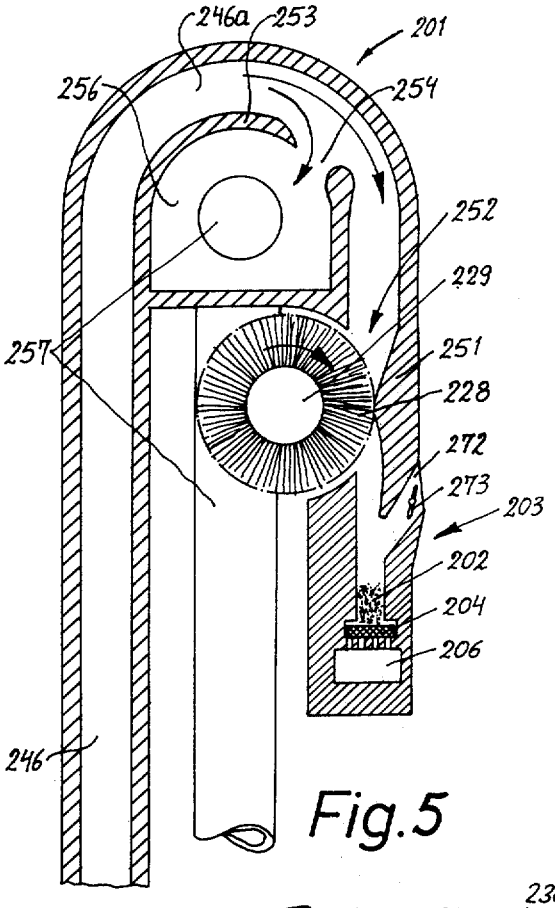
FIG. 5 is a fragmentary transverse vertical sectional view of a distributor which constitutes a first modification of the distributor shown in FIGS. 4a and 4b.

FIG. 5 illustrates a portion of a distributor 201 which constitutes a first modification of the distributor 101 of FIGS. 4a and 4b. All such parts of the distributor 201 of FIG. 5 which are identical with or clearly analogous to the corresponding parts of the distributor 101 are denoted by similar reference characters plus 100. The distributor 201 is designed for use in cigarette rod making machines which receive only lighter tobacco particles, i.e., wherein the segregation of heavier tobacco particles takes place before the lighter particles are caused to enter the pneumatic conveyor duct 246. Therefore, the separator chamber 162 of FIG. 4a has been omitted and the upper portion 246a of the duct 246 is curved so as to direct the lighter tobacco particles into the funnel 252. This funnel is defined in part by the bristles 228 of the accelerating device 229 and in part by the wall 251 of the distributor 201. The funnel 252 is located directly above the channel 203 for the tobacco stream 202 which grows on and travels with the upper stretch of the foraminous transporting conveyor 204. The suction chamber 206 attracts the particles of the stream 202 to the transporting conveyor 204 with a force which is determined by the setting of the regulating valve 273 in the opening 272. The inner side of the upper duct portion 246a is flanked by a wall 253 provided with one or more openings or ports 254 for admission of air into a suction chamber 256 connected to the suction generating device (not shown in FIG. 5) by a pipe 257. The wall 253 is of substantially semicylindrical shape. It will be noted that the bristles 228 propel into the channel 203 each and every particle of tobacco which rises in the duct 246.

Figure 6:
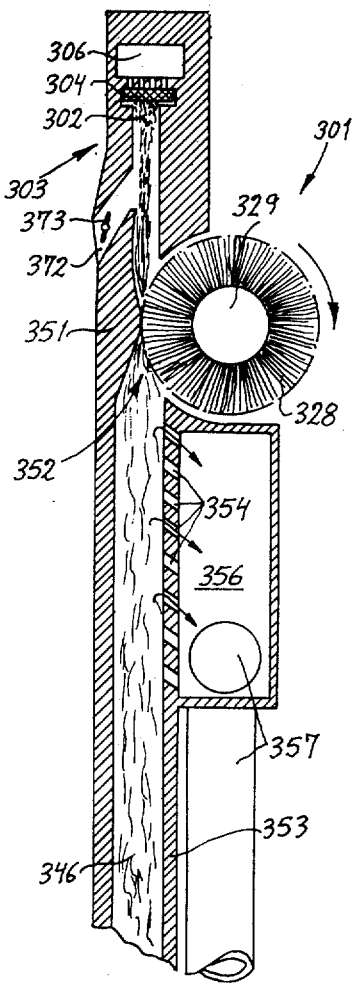
FIG. 6 is a fragmentary transverse vertical sectional view of a distributor which constitutes a second modification of the distributor shown in FIGS. 4a and 4b.

FIG. 6 illustrates a distributor 301 which constitutes a second modification of the distributor 101 shown in FIGS. 3a, 4a and 4b. All such parts of the distributor 301 shown in FIG. 6 which are identical with or clearly analogous to the corresponding parts of the distributor 101 are denoted by similar reference characters plus 200. The currents of air flowing upwardly in the duct 346 of FIG. 6 introduce tobacco shreds into a funnel 352 which is defined in part by protuberance of the wall 351 and in part by the bristles 328 of the accelerating device 329. The carrier medium which transports tobacco shreds in the duct 346 upwardly is withdrawn by way of ports 354 provided in a second wall 353 of the duct so that such air enters a suction chamber 356 which is connected with the intake of the blower (not shown) by a suction pipe 357.

The suction chamber 306 is provided in the uppermost part of the distributor 301 above the lower stretch of the transporting conveyor 304 which accumulates at its underside a growing tobacco stream 302. The tobacco channel 303 is provided with an opening 372 for a regulating valve 373 which controls the rate of air flow through the tobacco stream 302, through the foraminous transporting conveyor 304 and into the suction chamber 306. The bristles 328 of the accelerating device 329 propel the tobacco shreds which enter the funnel 352 so that the accelerated shreds come to rest at the underside of the lower stretch of the transporting conveyor 304 and are attracted thereto by suction in the chamber 306. The manner in which the tobacco stream 302 is thereupon converted into a rod-like filler and into a wrapped filler rod is the same as described in connection with FIGS. 1a and 1b. It will be noted that the funnel 352 of FIG. 6 receives only tobacco shreds, i.e., the segregation of tobacco shreds from ribs and/or stem takes place before the shreds enter the duct 346.

In the distributor 301, the accelerating device 329 is again located at a level between the feeding unit (not shown) and the transporting conveyor 304 but below the transporting conveyor, i.e., the bristles must propel the shreds upwardly with a force to insure that the density of the stream 302 preferably exceeds half the density of the filler in the wrapped rod.

Figure 7:
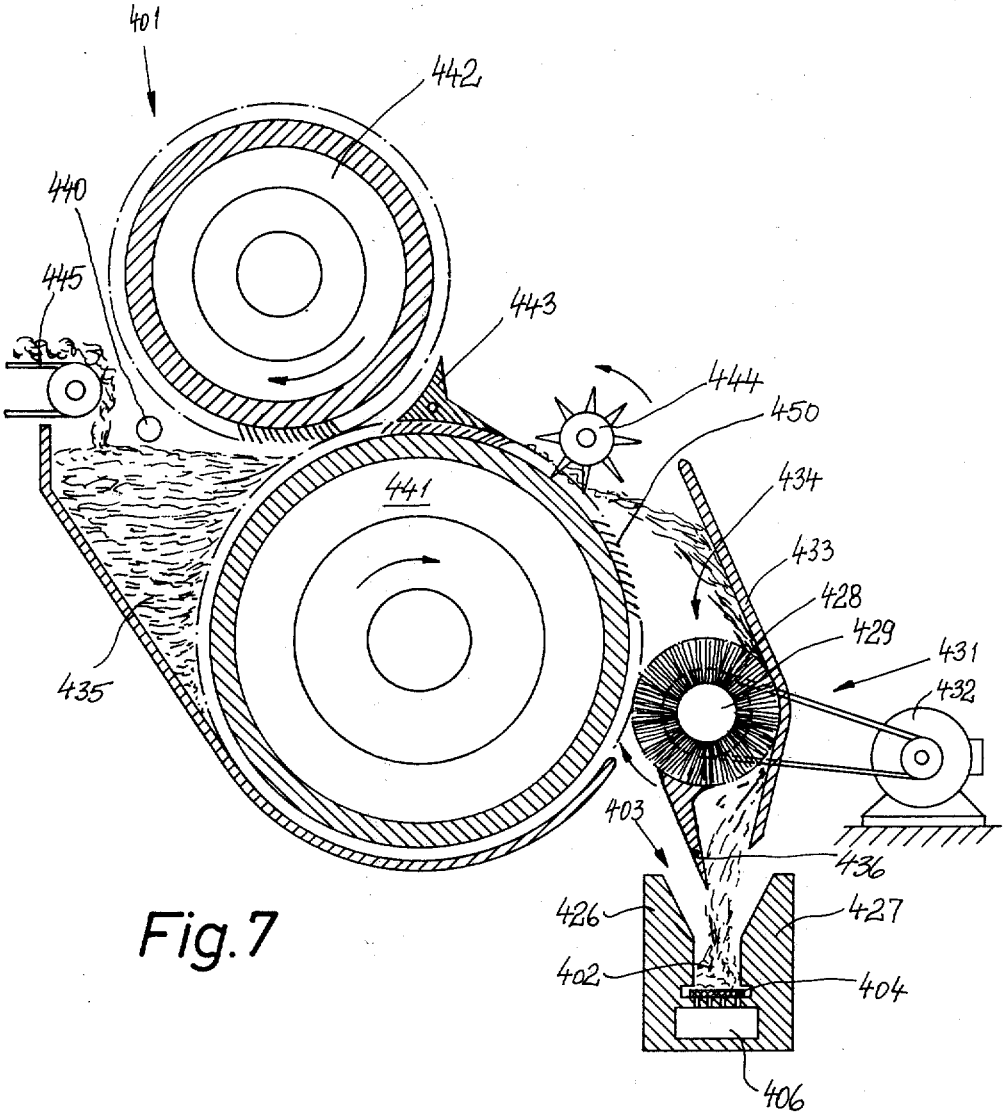
FIG. 7 is a fragmentary transverse vertical sectional view of a further tobacco stream building distributor.

FIG. 7 illustrates a distributor 401 which comprises a source of tobacco here shown as a hopper or magazine 435 containing a supply of shredded tobacco. Such tobacco is supplied by a conveyor belt 445 from a tobacco shredding machine, not shown, and the belt 445 is preceded by a separator which segregates the shreds from ribs and/or stem. The conveyor 441 of the feeding unit is a drum having a carding 450 which withdraws shredded tobacco from the magazine 435 and cooperates with a carded refuser drum 442 of the feeding unit. The drums 441, 442 rotate in opposite directions and the drum 442 returns the surplus of shredded tobacco into the magazine 435. The layer or carpet of tobacco shreds which is held by the carding 450 is transported below a mechanical retainer comb 443 and advances into the range of a rapidly rotating picker roller 444 which expels tobacco shreds from the carding 450 and propels them into a funnel 434 defined by a suitable inclined baffle or wall 433 and the bristles 428 of an accelerating device 429.

The conveyor belt 445 is driven intermittently or continuously at a varying speed, and its drive means is controlled by a photoelectric detector 440 which is mounted in or on the magazine 435 and produces signals in response to accumulation of a predetermined maximum supply of shredded tobacco. When the detector 440 produces a signal, the speed of the conveyor belt 445 is either reduced or the conveyor belt 445 is temporarily arrested so as to insure that the level of tobacco shreds in the magazine 435 cannot rise above the detector. The operating means for the rapidly rotating accelerating device 429 comprises a discrete electric motor 432 and a belt or chain transmission 431. The peripheral speed of the accelerating device 429 invariably exceeds the peripheral speed of the carded drum 441. The tips of bristles 428 touch the inner side of the baffle 433 so as to insure that each and every tobacco shred which enters the funnel 434 is accelerated at the same rate to be propelled downwardly along a second baffle 436 and to enter the channel 403. The walls 426 and 427 of the channel 403 are configurated in the same way as described in connection with the walls 26, 27 shown in FIG. 2. The growing tobacco stream 402 accumulates on the upper stretch of a foraminous transporting conveyor 404 which travels about a suction chamber 406. The suction chamber 406 draws currents of air from the atmosphere above the open upper end of the channel 403, and such currents pass through the tobacco stream 402 and the openings or interstices of the transporting conveyor 404 to enter the suction chamber 406 in order to prevent the conveyor 404 from slipping relative to the shreds which form the stream 402.

The operation of the distributor 401 is as follows:

The conveyor belt 445 supplies tobacco shreds into the magazine 435 whenever the level of the supply of tobacco in this magazine is below the detector 440. This insures that the magazine 435 contains [at] *a* constant supply of tobacco shreds which insures a uniform rate of withdrawal of tobacco shreds by the carding [carding] 450 of the drum 441. The carding of the refuser 442 removes the surplus of tobacco shreds from the carding 450 and the remaining (equalized) layer of tobacco shreds travels below the mechanical retainer 443 to move into the range of the rapidly rotating picker roller 444. The picker roller 444 propels the shreds against the inner side of the baffle 433 along which the shreds descend by gravity to enter the funnel 434 and to thus move into the range of rapidly orbiting bristles 428 of the accelerating device 429 which is driven by the electric motor 432 at a speed exceeding the speed of the carding 450. The bristles 428 accelerate the shreds and propel them directly into the channel 403 or against the inner side of the second baffle 436 so that the shreds accumulating on the upper stretch of the transporting conveyor 404 form a relatively dense tobacco stream 402. As mentioned before, the density of this tobacco stream is perferably more than half the density of the filler in the wrapped rod which leaves the wrapping mechanism of the cigarette rod making machine embodying the distributor 401. The energy of tobacco shreds which are propelled by the bristles 428 greatly exceeds the energy of shreds which would descend by gravity from the funnel 434 directly into the channel 403. The suction chamber 406 holds the shreds of the stream 402 against slippage relative to the upper stretch of the transporting conveyor 404 which advances the stream toward the trimming device, not shown in FIG. 7. The acceleration of shreds which are propelled downwardly by the bristles 428 is sufficient to insure that the shreds forming the tobacco stream 402 not only deposit on top of each other but that the shreds also penetrate into the interstices between adjoining shreds which further contributes to greater density and uniformity of the stream 402. As explained in connection with FIG. 2, the density of the stream 402 is preferably sufficient to insure that this stream expands only slightly if the suction in the chamber 406 is terminated. In other words, when compared to the densifying and accelerating action of the bristles 428, the densifying action of air flowing into the chamber 406 is negligible.

An important advantage of the improved distributors is that they are capable of building a continuous tobacco stream wherein the particles of tobacco are densely packed so that the density of the entire stream at the upper side or at the underside (see FIG. 6) of the transporting conveyor is uniform all the way from the adjacent stretch of this conveyor and to the exposed surface of the stream. The electric motor or another prime mover which drives the accelerating device is preferably adjustable so that it can drive the bristles at a selected speed which is sufficient to build on the transporting conveyor a tobacco stream of desired density. Thus, the density of the tobacco stream is a function of the spped at which the bristles orbit about the axis of the accelerating device. Uniform density of the tobacco stream which is formed in the channel of the distributor is desirable because such stream can be readily equalized or trimmed to form a filler rod whose density is uniform in each and every zone thereof.

The distributors of FIGS. 2 and 7 (particularly the distributor of FIG. 7) exhibit the additional advantage that the magazine for the tobacco shreds can be placed very close to the channel 3 or 403. This insures that the consistency of shreds is changed very little during transfer onto the stream transporting conveyor. In addition, and as mentioned before, the carding 450 of the conveyor 441 shown in FIG. 7 is capable of withdrawing tobacco shreds at a uniform rate because the upper level of the mass of tobacco shreds in the magazine 435 fluctuates very little or not at all. The manner in which a detector 440 can control the motor or transmission for the conveyor belt 445 is well known in the [,] and, therefore, the operative connection between the detector 440 and the belt 445 has not been shown in FIG. 7. It is clear, however, that the magazine 435 of FIG. 7 can also receive a mixture containing shreds and tobacco ribs and/or stem if the nature of the final product is such that its filler can contain both types of tobacco. The same holds true for the distributor 1, 101, 201 and/or 301.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is: [set forth in the appended claims]

1. In a machine for the making of tobacco filler rods, apparatus for building a tobacco stream comprising a source of comminuted tobacco; a tobacco feeding unit arranged to draw tobacco from said source and including a first conveyor operable at a plurality of speeds to transport the withdrawn tobacco along a first portion of a predetermined path; a tobacco stream transporting second conveyor adjacent to means defining a relatively narrow second portion of said path; an accelerating device comprising a rotary conveyor and wall means defining with said rotary conveyor a funnel which receives tobacco supplied by said first conveyor, said accelerating device being disposed between said *first and second* conveyors and operative to mechanically accelerate comminuted tobacco for transfer into and densification in said narrow second portion of said path wherein the accelerated tobacco forms a narrow growing stream which is transported by said second conveyor; and means for operating said accelerating device independently of at least one of said *first and second* conveyors.

2. Apparatus as defined in claim 1, wherein said first conveyor is located at a level above said accelerating device and the tobacco descends by gravity into the range of said accelerating device.

3. Apparatus as defined in claim 1, wherein said first conveyor is located at a level below said second conveyor.

4. Apparatus as defined in claim 1, wherein said second conveyor is located at a level above said accelerating device.

5. Apparatus as defined in claim 1, wherein said accelerating device is located at a level above said second conveyor.

6. Apparatus as defined in claim 1, further comprising means for classifying the particles of comminuted tobacco in advance of said accelerating device.

7. Apparatus as defined in claim 6, wherein said classifying means is located at a level above said accelerating device.

8. Apparatus as defined in claim 1, wherein said first conveyor is arranged to draw tobacco from said source and said feeding unit further comprises means for removing tobacco from said first conveyor, said accelerating device being disposed at a level above said second conveyor and below said removing means and said removing means being arranged to supply tobacco to said accelerating device by gravity flow.

9. Apparatus as defined in claim 8, wherein said first conveyor is a carded conveyor and said removing means comprises a picker roller.

10. Apparatus as defined in claim 9, wherein said feeding unit further comprises refuser means for equalizing the comminuted tobacco which is being drawn from said source by said carded conveyor.

11. Apparatus as defined in claim 1, further comprising an elongated tobacco channel provided with an elongated suction chamber, said second conveyor consisting of foraminous material and having an elongated stretch one side of which is adjacent to said chamber and the other side of which receives tobacco from said accelerating device.

12. Apparatus as defined in claim 1, wherein said second portion of said path is substantially normal to said first portion of said path, said first conveyor being arranged to supply a sliver of comminuted tobacco and said accelerating device comprising a rotary conveyor having an axial length at least approximating the width of the sliver on said first conveyor.

13. Apparatus as defined in claim 1, further comprising prime mover means for driving said first conveyor in synchronism with said second conveyor, said means for operating said accelerating device comprising a discrete motor.

14. Apparatus as defined in claim 13, wherein said first and second conveyors are endless belts.

15. Apparatus as defined in claim 1, wherein the filler rod produced by said machine has a predetermined density and said means for operating said accelerating device comprises means for driving said rotary conveyor at a peripheral speed which is high enough to impart to comminuted tobacco a kinetic energy sufficient to build on said second conveyor a tobacco stream whose density exceeds one-half of said predetermined density.

*16. In a machine for the making of tobacco filler rods, apparatus for building a tobacco stream comprising a source of intermixed lighter and heavier tobacco particles, particularly intermixed tobacco shreds and ribs; a tobacco feeding unit arranged to draw tobacco particles from said source and including a first conveyor operable at a plurality of speeds to transport the withdrawn tobacco particles along a first portion of a predetermined path; channel means defining a relatively narrow second portion of said path; a second conveyor adjacent to said channel means and arranged to transport tobacco particles along said second portion of said path; means for transferring tobacco particles from said first conveyor and for transferring lighter particles onto said second conveyor, including an accelerating device comprising a rotary third conveyor and wall means defining with said third conveyor a funnel which receives tobacco particles supplied by said first conveyor, said accelerating device being disposed intermediate said first and second conveyors and being operative to mechanically accelerate said lighter and heavier particles whereby the flight spans of said heavier particles are different from the flight spans of said lighter particles with attendant segregation of said lighter particles from said heavier particles, said lighter particles being transferred into and densified in said channel means wherein said lighter particles form a narrow growing stream which is transported by said second conveyor; means for operating said third conveyor independently of at least one of said first and second conveyors; and means for intercepting said segregated heavier particles.*

*17. Apparatus defined in claim 16, wherein said transferring means further comprises means for removing lighter and heavier tobacco particles from said first conveyor.*

*18. Apparatus as defined in claim 17, wherein said lighter and heavier tobacco particles form on said first conveyor a relatively wide sliver and said first conveyor is a carded conveyor.*

*19. Apparatus as defined in claim 18, wherein said removing means comprises a picker roller.*

*20. Apparatus as defined in claim 16, wherein said third conveyor comprises a substantially cylindrical brush having an annulus of bristles.*

*21. Apparatus as defined in claim 16, wherein said operating means includes means for rotating said third conveyor at a peripheral speed exceeding each of said plurality of speeds.*

*22. Apparatus as defined in claim 16, further comprising a separator chamber for said funnel and said intercepting means.*

* * * * *